United States Patent [19]

Ebner

[11] 4,342,504
[45] Aug. 3, 1982

[54] LED-FIBER OPTIC CHARACTER PRINTER

[75] Inventor: Peter R. Ebner, Milford, N.H.

[73] Assignee: Itek Corporation, Lexington, Mass.

[21] Appl. No.: 181,312

[22] Filed: Aug. 25, 1980

[51] Int. Cl.$^3$ .............................................. B41B 19/00
[52] U.S. Cl. ......................................... 354/7; 354/5;
346/107 R
[58] Field of Search ....................... 354/5, 6, 7, 12, 13,
354/18, 19; 346/29, 107 R, 108, 139 R

[56] References Cited

U.S. PATENT DOCUMENTS

| | | | |
|---|---|---|---|
| 2,982,175 | 5/1961 | Eisler | 88/24 |
| 3,069,682 | 12/1962 | Reese | 346/107 |
| 3,116,963 | 6/1969 | Kiyasu et al. | |
| 3,401,398 | 7/1966 | Lichtenstein | 346/107 |
| 3,458,655 | 1/1969 | Thourson | 178/30 |
| 3,555,555 | 1/1971 | Lambert | 346/107 R |
| 3,619,516 | 11/1971 | Miller et al. | 179/100 |
| 3,626,423 | 12/1971 | Ameen | 346/107 |
| 3,644,922 | 2/1972 | James et al. | 340/324 |
| 3,832,488 | 8/1974 | Fahey et al. | 178/15 |
| 3,930,259 | 12/1975 | Hoskins | 346/139 R |
| 3,952,311 | 4/1976 | Lapeyre | 354/5 |
| 3,988,742 | 10/1976 | Meier et al. | 346/107 |
| 4,000,495 | 12/1976 | Pirtle | 354/7 |

*Primary Examiner*—Russell E. Adams
*Attorney, Agent, or Firm*—Homer O. Blair; Robert L. Nathans; Gerald H. Glanzman

[57] ABSTRACT

A relatively narrow printing head scans across photosensitive material and in one scan generates a line of characters thereon. Digital control signals selectively illuminate the LEDs formed within a matrix thereof. A flexible loop of flat fiber optic filaments having their input ends coupled to the LEDs and having their output ends positioned within the print head, enables the use of a relatively small number of fiber optic filaments and yet provides for extremely high-speed recordation of the characters upon the film which contacts the print head. After a line has been photographically recorded, the film is stepped in a direction perpendicular to the direction of scanning of the print head and another line is recorded. An inexpensive and highly accurate print head carriage is disclosed, along with a unique belt drive for driving the carriage without inducing torque therein, owing to possible misalignment of the drive belt.

23 Claims, 6 Drawing Figures

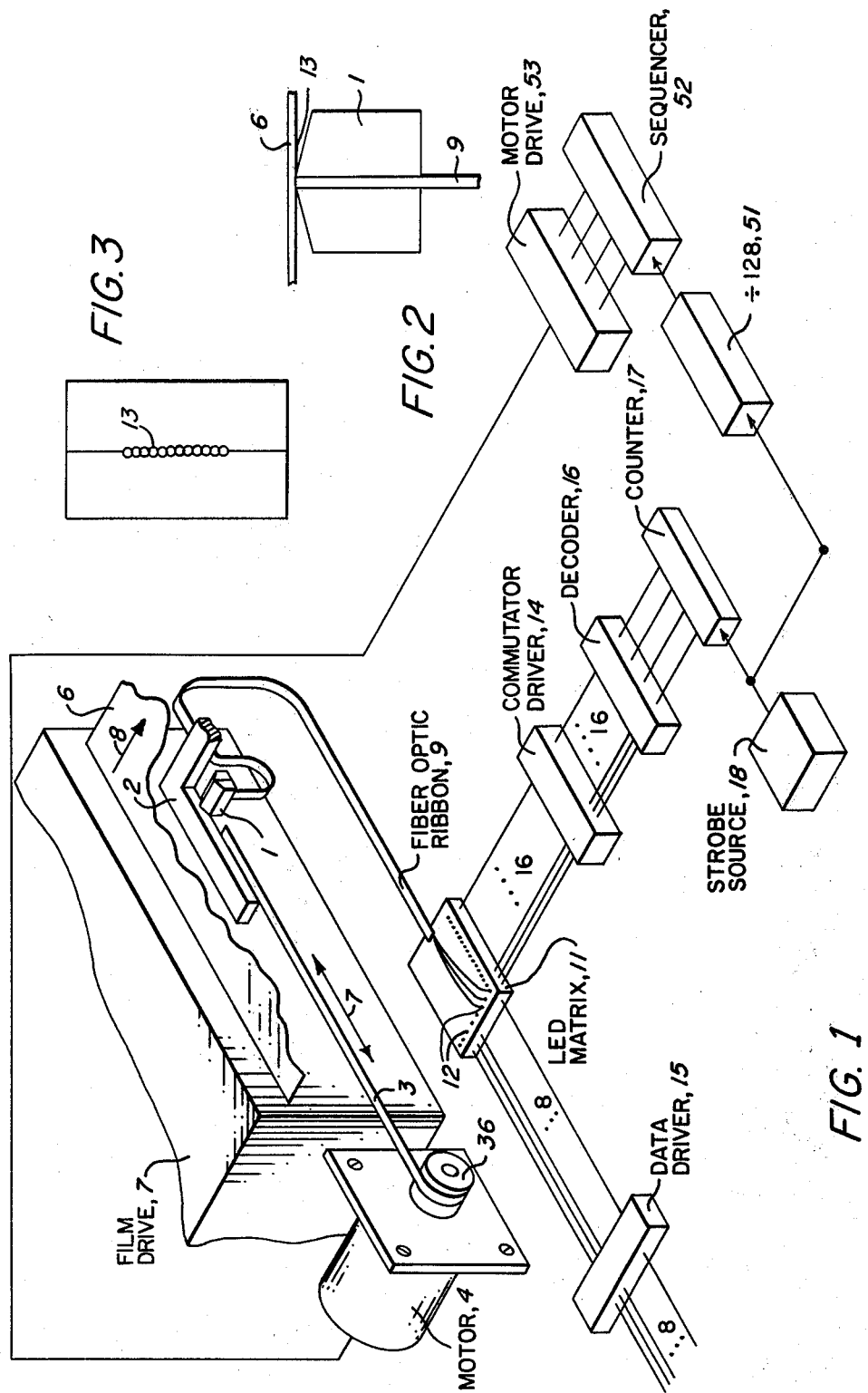

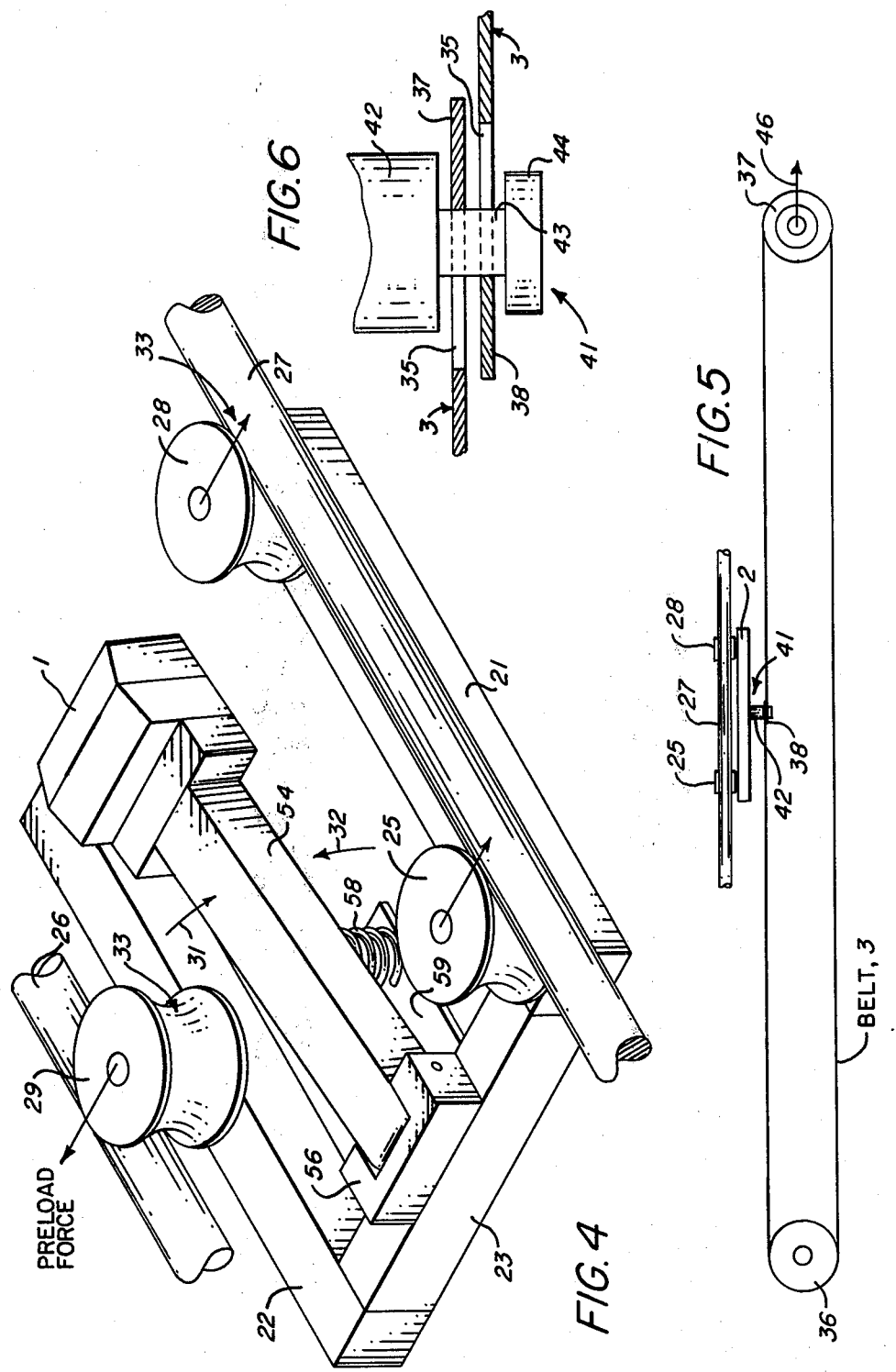

LED-FIBER OPTIC CHARACTER PRINTER

BACKGROUND ART

This invention relates to graphic imaging systems and more specifically character printers which are particularly useful in phototypesetters.

During the last 30 years, numerous so-called second generation phototypesetters have been marketed. These machines flash-illuminate characters positioned upon a whirling character disk or drum, and the resulting optical image is projected by a lens system upon a photosensitive film. The size of the characters are changed by means of moving zoom lenses or the like or by rotating a lens turret to position various lenses at the optical projection axis. The characters are sequentially recorded upon the photosensitive film by mechanically scanning such film which may be accomplished in various ways. The film carriage may be moved relative to the optical axis, the projection lenses may be moved relative to the film platen, the whirling character disk may be moved relative to the film platen, or various combinations of the foregoing may be employed to sequentially project the characters upon the film to form a line of characters. Generally, the projection lens carriage assemblies are relatively heavy and bulky, as is the drum or disk bearing the images of the characters to be projected. Also, changes in the fonts involve manual replacement of the character disks, or film strips mounted upon a drum. Additionally, the electromechanical stepping devices for producing the above mentioned scanning motions are also relatively bulky and cumbersome. The speed of second generation machines is limited by the output carriage escapement speed and by character access time determined by the rotational speed of the font disk.

So-called third generation phototypesetters were introduced in the 1960s, most of which utilize cathode ray tubes for generating the characters upon the face of the tube. These character images are thereafter optically projected upon the film. In contrast with the components of the second generation machines, the electron beam is inertialess and the binary character codes thus may actuate the beam at much higher speeds than those obtainable by the second generation machines. Inertialess laser generated light beams have also been employed rather than cathode ray tubes. Many font families may be generated by these machines since the character generating codes may be densely packed during recordation upon magnetic storage media, such as floppy disks. Also, the character size may be electronically changed by changing the length of the beam traces making up the character components (See FIG. 1 of U.S. Pat. No. 3,952,311).

The result of the foregoing is that these machines have higher speeds, and greater flexibility in the character shapes and sizes produced. However, the third generation machines are usually considerably more expensive than the second generation machines; in 1979, they typically sold for $40,000 on up. In contrast, second generation machines in 1979 have been marketed for around $10,000.

It is a principal object of the present invention to provide a fourth generation phototypesetter that can be marketed for around $10,000, and yet have the speed and flexibility of third generation machines.

It is a further object of the invention to provide a phototypesetter that is relatively light in weight and compact, since the relatively bulky high mass components of the second generation phototypesetters have been eliminated.

It is yet a further object of the present invention to provide a radically new phototypesetter having a printing device which is very inexpensive and may be rapidly replaced to reduce maintenance costs.

The use of arrays of fiber optic bundles for printing characters is old in the art. In U.S. Pat. No. 3,832,488, a matrix of light emitting diodes (LEDs) selectively illuminates the input ends of the fiber optic light pipes and a lens focuses the resulting image at the output of light pipes upon microfilm. In U.S. Pat. No. 3,988,742, a fiber optic bundle is in direct contact with microfilm and is controlled by binary signals which selectively operate an LED array. In U.S. Pat. No. 2,982,175, the input ends of the fiber optic bundle are illuminated in accordance with an optical image. In U.S. Pat. No. 4,000,495, an array of 5,000 fibers contact the film and record the characters thereon; see also U.S. Pat. Nos. 3,952,311, 3,458,655, and 3,644,922.

In U.S. Pat. No. 3,699,516, a two-dimensional optical image is projected by a lens turret upon the input end of a fiber optic cable, and means are provided for causing the output end of the cable to scan a photosensitive medium along with a lens which projects the image at the output of the cable upon the medium to set type. Since the optical image is two-dimensional, a linear array of filaments cannot be used, and thus, the fiber optic cable is relatively heavy. It is believed that in the commercial phototypesetting machine marketed by Graphic Systems, Inc., having the configuration of this patent, the fiber optic cable had over 300,000 fibers. As a result, the scanning speed was quite slow due to the high mass of the cable compared to the high scanning speed of the printing head of the present invention. This machine is also relatively heavy and bulky and cumbersome owing to the use of a font drum and lens turret.

In spite of the existence of the above-mentioned prior art, an inexpensive high-speed phototypesetter capable of setting over 500 newspaper lines per minute, for example, has never been marketed. It is believed that this has not occurred since the direct application of the teachings of the prior art would require thousands of fiber optic filaments, which is impractical due to the failure rate of the various components. Failures in the operation of the LEDs, failures in the joints between the LEDs and the input ends of the optical fibers, fiber breakage, and misalignment between the input ends of the fiber optic filaments and the LEDs all create substantial problems with respect to the application of LED illuminated fiber optic arrays.

For example, if one were to construct a phototypesetter following the teachings of Lapeyre, U.S. Pat. No. 3,952,311, 3,000 optical fibers would be required for a 10-inch line length since 300 emitters per inch are required (see lines 61 and 62 of Column 2 of this patent). It is also obvious from the inspection of James et al, U.S. Pat. No. 3,644,922, that thousands of fibers would be required. It may be demonstrated statistically that the reject rate in manufacturing increases at a rate which is nonlinear relative to the number of fibers, so that the use of a scanning head having relatively few fibers in the present invention, for the first time, renders this approach practicable.

If, for the purpose of comparison, one assumes that during manufacturing, a yield of 50% good fiberoptic/LED transducers can be achieved with 128 LED transducers, then one can calculate as follows, using well-recognized probability theory, that 3,000 LED transducers will have a virtually unusable yield of 0.0000088%.

assume: $P_{128} = 0.5$
then:
$P_{128} = 0.5 = (P_L)^{128}$ and $P_{3000} = (P_L)^{3000}$
therefore:

$$\log .5 = 128 \log P_L \text{ and } \log P_{3000} = 3000 \log P_L$$

$$\frac{\log .5}{128} = \log P_L$$

$$\log P_{3000} = 3000 \frac{\log .5}{128}$$

$$\log P_{3000} = -7.05$$

$$P_{3000} = 10^{-7.05} = .0000088\%$$

where:
$P_{128}$ = probability of a good transducer having 128 LEDs
$P_{3000}$ = probability of a good transducer having 3000 LEDs
$P_L$ = probability of any one LED being good.

Thus, it is an important object of the invention to drastically reduce the number of fiber optic filaments which are employed, to alleviate the problem of the above stated failures. Should such failures occur, it is a further object of the invention to provide a printing device which is inexpensive and is readily replacable.

It is a further object of the invention to provide a novel print head drive carriage which is inexpensive to manufacture and which will maintain accurate tolerances in that no "play" will exist with respect to undesired slight random motion of the print head, and at the same time, the carriage drive will not be susceptible to jamming. It is a further object of the invention to provide a novel drive belt to print head carriage coupling arrangement which prevents belt misalignment from inducing undesirable random motion of the print head.

SUMMARY OF A PREFERRED EMBODIMENT OF THE INVENTION

The above mentioned objects have been accomplished by providing a flexible ribbon of a relatively small number of fibers, having its input end illuminated by a matrix of LEDs and having its output end positioned within a printing head having at least one relatively short linear array embedded therein, together with means for causing the head to scan across the photosensitive material to record a line of type thereon. The film is thereafter stepped by a leading motor and the scanning is repeated. Flexibility of the light weight fiber optic ribbon enables the rapid scanning of the print head bearing a drastically reduced number of fiber optic filaments, e.g., 128, in contrast with the thousand of filaments called for by the teachings of the prior art.

The print head carriage employs a pair of inwardly flexed elongated elements which bear two rollers on one element and one roller on the other element which are positioned upon the elements so that the rollers press firmly against a pair of carriage guide rails after the inward flexing of the elongated elements is removed. The novel belt drive to print head carriage coupling arrangement comprises a coupling pin which is positioned within apertures formed within a first and second terminal portion of the belt so that belt misalignment does not induce torque into the print head drive carriage to cause undesirable random motion of the print head. The character printer may be used with most photographic materials including conventional silver materials, electrographic materials, dry silver materials, etc.

Other objects, features, and advantages of the present invention will become apparent upon study of the following detailed description, taken in conjunction with the drawings in which:

FIG. 1 discloses a preferred embodiment of the present invention;

FIG. 2 discloses a side view of the print head;

FIG. 3 discloses a top view of the print head;

FIG. 4 discloses an embodiment of the print head carriage; and

FIGS. 5 and 6 disclose an embodiment of the belt drive to carriage coupling arrangement.

DETAILED DESCRIPTION

Referring now to FIG. 1, print head 1 is positioned upon print head drive carriage 2 which in turn is coupled to belt 3 driven by scanning motor 4. Print head 1 contacts film 6 and scans across the film as indicated by arrow 7 to record a line of characters thereon. After the recordation of the line of characters, a film drive device 7 causes the film to be stepped in a direction indicated by arrow 8 which is perpendicular to the print head scanning direction to set the stage for the recordation of the next line of characters. A flexible loop or ribbon of fiber optic filaments 9 is employed to forward the optical signals produced by LED matrix 11 to the print head. In the embodiment of the invention constructed by the inventor, the array of light emitting diodes (LEDs) consisted of 16 columns of LEDs, each of which contains 8 LEDs, thereby to provide 128 individual light channels. The input ends 12 of each filament are optically aligned with an associated LED. The output ends 13 are embedded within print head 1, and contact film 6, as shown in FIGS. 2 and 3. Only a limited number of output ends 13 of the filaments are illustrated in FIG. 3; two rows of filaments, each having 64 fibers were employed in the printer constructed by the inventor and are staggered to prevent light "gapping" and thus provide for overlap of the tiny light sources. This arrangement is illustrated in FIGS. 4-8 of the above-mentioned U.S. Pat. No. 3,952,311. The control electronics include commutator driver 14 for sequentially enabling each LED column and the parallel binary data input driver 15, together with decoder 16, counter 17 and strobe pulse source 18. The very rapid rate of production of the optical signals generated by LED matrix 11 is directly proportional to the scanning speed. Such action is provided by the strobe pulse source 18, which controls counter 17. Pulse source 18 could include a "picket fence"/photocell pick-off arrangement, which "picket fence" is mechanically coupled to the belt drive means. Other devices may be coupled to the scanning motor drive shaft which will produce the pulse train having a frequency proportional to the scanning velocity of the belt. The prototype built by the inventor had a synchronous motor driving the head scanning system. The above mentioned strobe source, besides driving counter 17, also drives a divide-down counter 51, which in turn controls a four-phase motor winding sequencer 52, to cause the motor drive circuits 53 to drive motor 4 at the correct speed.

In the interest of clarity, brevity and economy, further details of the control electronics are not set forth. However, reference may be made to the following U.S. patent art incorporated by reference herein for a disclosure of typical control circuitry: U.S. Pat. Nos. 3,952,311 (FIG. 3); 3,832,488 (FIGS. 7-14); 3,988,742 (FIGS. 1-7); and 4,000,495 (FIGS. 1-2).

It is an important aspect of the invention to provide a print head having a relatively few number of fibers, but which upon a single scan of the film, will preferably generate a complete line of characters. This action is made possible by the use of a flexible loop having at least one flat layer of fiber optic filaments mounted upon a flexible substrate. While a flat configuration is most preferred since flexing fatiguing of the fibers is minimized, other than flat configurations may be employed, as long as the flexing of the loop is enabled to provide for scanning of the film across its entire width by a print head having relatively few fiber optic filaments, compared to the prior art.

The novel print head drive carriage of the present invention is illustrated in FIG. 4 wherein a first elongated element 21 is coupled to a second elongated element 22 via bridging element 23. Print head 1 is mounted upon the carriage by supporting the head on a beam 54, which in turn is pivotably mounted upon the end of the carriage via pivot mounting member 56. The beam or arm is upwardly biased to maintain contact with the film by means of a spring 58, in turn supported by a carriage mounted support means 59. Cylindrical carriage guide rails 26 and 27 are also illustrated. Elongated element 21 bears rollers 25 and 28, while elongated element 22 bears a single roller 29. These rollers are rotatably mounted upon the print head drive carriage at portions such that after the inward flexing of the elongated elements toward each other as indicated by arrows 31 and 32, the rollers will be mounted upon the guide rails by being slipped into position from the terminal guide rail portions such that the release of the inward flexing forces causes the rollers to press against the rails to cause the carriage to be securely guided by the rails. It is preferred that the peripheral roller portions be shaped in the form of a trench or trough, as illustrated at 33 such that the rollers are held firmly in position by rails 26 and 27 which have complimentary curved surfaces, in order to snuggly support the carriage to eliminate undesirable carriage play. This is important where the present invention is employed in a phototype-setter. At the same time, the triple roller configuration cannot jam in spite of variations in manufacturing tolerances. The carriage member is preferrably formed of a homogeneous mass which may be readily flexed to reduce the separation between the ends of the elongated elements by about 5 thousands of an inch. The resulting "spring back" will effect the above stated beneficial results.

In FIG. 5, carriage drive belt 3 is supported by drums 36 and 37 which rotatably support and drive the belt. The belt has a first terminal portion 37 and a second terminal portion 38, illustrated in FIG. 6, and apertures 35 formed within the terminal portions. The belt drive to carriage coupling means 41 comprises a cylindrical member having a groove 43 formed within the cylindrical member, and further includes an upper cylindrical portion 42, shown in FIGS. 5 and 6, which in turn is mounted upon the lower portion of print head drive carriage 2. The lower cylindrical portion 44 has a diameter which is slightly less than the diameter of the belt apertures in order to permit the terminal portions of the belt, 37 and 38, to pass through the lower cylindrical portion 44, 46, etc. Removal of the belt is accomplished by eliminating the previously supplied tension which permits the apertures to be again aligned with the lower cylindrical portion 44 so that the belt may be easily and rapidly removed from the belt to carriage coupling member. It should be noted that after the belt is mounted upon this member, the previously mentioned act of inducing tension into the belt causes the apertures to be positioned as shown in FIG. 6 so that the belt cannot slip off the coupling member due to such tension.

The upper portion of cylinder 42 is affixed to the lower portion of carriage 2 as illustrated in FIG. 5. The rollers and guide rails are also shown in FIG. 5. As a result of this configuration, any relative angular displacement of one terminal portion of the belt relative to the other terminal portion of the belt will not induce torque into the carriage print head owing to the resulting angular play between the terminal portions of the belt. In contrast, the use of a conventional endless belt could induce such torque due to misalignment.

As explained herein above, it is far less likely that there will be a failure in the proper operation of the filaments since the number employed are far less than the systems of prior art. However, should such failures occur, the print head, LED matrix, and fiber optic ribbon may be rapidly removed as a unit and replaced by a new matrix-ribbon-print head assembly.

In the prototype machine built by the inventor, the spot size or diameter of each fiber optic filament was 0.002 inches; the print head scanning speed was 17.86"/sec. (536 newspaper lines/minute); the total inward flexing displacement of both elongated elements at the terminal portions thereof was 0.005 inches; the width of the flexible loop was 0.250"; the total thickness of the flexible loop was 0.008"; the loop substrate material was spring steel; the character resolution: 667 lines/inch.

Besides use in a phototypesetter, this invention may be employed in line by line telecopiers and computer readout printers, graph recordation devices, etc.

It should be understood that other components and configurations may be substituted for those described in order to practice the invention, and the invention is to be limited only by the permissable scope of the following claims.

I claim:

1. A system for recording indicia upon a photosensitive medium comprising:
   a. an array of light emitting elements;
   b. digital electronic control means for causing said light emitting elements to be selectively illuminated by the application of electrical pulses thereto;
   c. a print head;
   d. a print head transport carriage coupled to said print head;
   e. belt drive means including a belt having first and second terminal portions coupled to said print head carriage for driving said carriage in a first direction, said belt further including a first aperture formed within said first terminal portion of said belt and a second aperture formed within said second terminal portion of said belt, together with belt to carriage coupling means coupled to said print head carriage and positioned within said first and second apertures of said belt to provide for angular displacement of said first terminal portion of said belt relative to said second portion of said belt;
f. means for causing said film to be transported in a second direction transverse to said first direction after said print head scans said film in said first direction;
g. a flexible loop of light conducting elements;
h. means for coupling the input ends of said light conducting elements to associated light emitting elements of said array of light emitting elements, and
j. means for coupling the output ends of said light conductive elements to said print head.

2. The combination as set forth in claim 1 wherein the portion of said belt to carriage coupling means positioned within said belt apertures has a cylindrical configuration.

3. The combination as set forth in claims 1 or 2 further including a cap mounted upon said belt to carriage coupling means to prevent the said terminal portions of said belt from becoming disengaged from said belt to carriage coupling means during operation of said system.

4. A print head drive device for recording indicia upon a photosensitive medium comprising:
a. a print head;
b. a print head transport carriage coupled to said print head;
c. belt drive means including a belt having first and second terminal portions, coupled to said print head carriage for driving said carriage in a first direction, said belt further including a first aperture formed within said first terminal portion of said belt and a second aperture formed within said second terminal portion of said belt, together with belt to carriage coupling means coupled to said print head carriage and positioned within said first and second apertures of said belt to provide for angular displacement of said first terminal portion of said belt relative to said second terminal portions of said belt; and,
d. means for causing said film to be transported in a second direction transverse to said first direction after said print head scans said film in said first direction.

5. The combination as set forth in claim 4 wherein said belt to carriage coupling means has a cylindrical configuration.

6. The combination as set forth in claims 4 or 5 further including a groove formed within said belt to carriage coupling means for preventing the said terminal portions of said belt from becoming disengaged from said belt to carriage coupling means during operation of said system.

7. A system for recording indicia upon a photosensitive medium comprising:
a. an array of light emitting elements;
b. digital electronic control means for causing said light emitting elements to be selectively illuminated by the application of electrical pulses thereto;
a print head;
d. a pair of carriage guide rails;
e. a print head carriage including first and second elongated elements coupled together and capable of being inwardly flexed toward each other;
f. roller means mounted upon said elongated carriage elements and positioned thereon to press outwardly against said rails upon the inward flexing of said elongated elements;
g. means for mounting said print head upon said print head carriage;
h. print head carriage drive means for causing said print head to scan said photosensitive medium in a first direction, said print head carriage drive means further including belt drive means including a belt driven thereby and having first and second terminal portions coupled to said print head carriage for driving said carriage in a first direction, said belt further including first and second apertures formed within first and second terminal portions of said belt, together with belt to carriage coupling means positioned within said first and second apertures of said belt to provide for angular displacement of said first terminal portion of said belt relative to said second portion of said belt.
i. means for causing said film to be transported in a second direction transverse to said first direction after said print head scans said film in said first direction;
j. a flexible loop of light conducting elements;
k. means for coupling the input ends of said light conducting elements to associated light emitting elements of said array of light emitting elements, and
l. means for coupling the output ends of said light conductive elements to said print head.

8. The combination as set forth in claim 7 wherein said print head carriage includes a homogeneous u-shaped body which includes first and second elongated elements.

9. The combination as set forth in claim 7 wherein said roller means comprises two rollers positioned upon said first elongated element and a single roller positioned upon said second elongated element.

10. The combination as set forth in claim 8 wherein said roller means comprises two rollers positioned upon said first elongated element and a single roller positioned upon said second elongated element.

11. The combination as set forth in claims 9 or 10 wherein said rollers have trough-shaped peripheral portions.

12. A phototypesetter for recording lines of type upon a photosensitive medium comprising:
a. an array of light emitting elements;
b. digital control means for causing said light emitting elements to be selectively illuminated by the application of electrical pulses thereto;
c. a print head;
d. means for causing said print head to scan said photosensitive medium in a first direction to record a complete line of characters during a single scan;
e. means for producing relative motion between said film and said print head in a second direction substantially perpendicular to said first direction after said print head scans said film in said first direction to enable recordation of the next complete line of characters during a succeeding single scan;
f. a flexible loop of light conducting elements;
g. means for coupling the input ends of said light conducting elements to associated light emitting elements of said array of light emitting elements, and
h. means for coupling the output ends of said light conductive elements to said print head in a manner to form a linear array of light conductive elements oriented transverse to said first direction.

13. The combination as set forth in claim 12 wherein said flexible loop of light conducting elements is configured in the form of a thin flat ribbon.

14. The combination as set forth in claim 13 wherein said thin flat ribbon includes a flexible flat substrate for supporting said light conducting elements.

15. The combination as set forth in claims 12, 13 or 14 wherein said flexible loop of light conducting elements includes a layer of optical fibers.

16. The combination as set forth in claims 12, 13 or 14 wherein said light conductive elements comprise lightweight fiber optic filaments.

17. The combination as set forth in claim 16 further including means for positioning said print head against said photosensitive medium.

18. The combination as set forth in claim 12 wherein said linear array is oriented perpendicular to said first direction.

19. A system for recording indicia upon a photosensitive medium comprising:
 a. a print head;
 b. first and second carriage rails positioned substantially parallel to one another;
 c. a print head carriage having a first elongated element, having a first and second roller thereon, together with a second elongated element coupled to said first elongated element and having a third roller mounted thereon at a position to cause the outer portions of said first and second rollers to press outwardly against the inside portion of said first guide rail and to cause the outer portion of said third roller to press outwardly against the inside portion of said second guide rail upon the mounting of said print head carriage upon said guide rails;
 d. means for mounting said print head upon said print head carriage;
 e. print head carriage drive means for causing said print head to scan said photosensitive medium in a first direction; and
 f. means for causing said film to be transported in a second direction transverse to said first direction after said print head scans said film in said first direction.

20. The combination as set forth in claim 19 further including:
 a. an array of light emitting elements;
 b. digital electronic control means for causing said light emitting element to be selectively illuminated by the application of electrical pulses thereto;
 c. a flexible loop of light conducting elements;
 d. means for coupying the input ends of said light conducting elements to associated light emitting elements of said array of light emitting elements, and
 e. means for coupling the output ends of said light conductive elements to said print head.

21. The combination as set forth in claims 19 or 20 wherein said print head carriage includes a homogeneous mass which includes said first and second elongated elements, which may be readily flexed to reduce the separation between the ends of said elongated elements by about five thousands of an inch.

22. The combination as set forth in claims 19 or 20 wherein said rollers have trough-shaped peripheral protions.

23. The combination as set forth in claim 21 wherein said rollers have trough-shaped peripheral portions.

* * * * *